Nov. 10, 1964  G. E. JOYNER  3,156,082
MOWER BLADE CONSTRUCTION
Filed July 26, 1962
FIG. 1
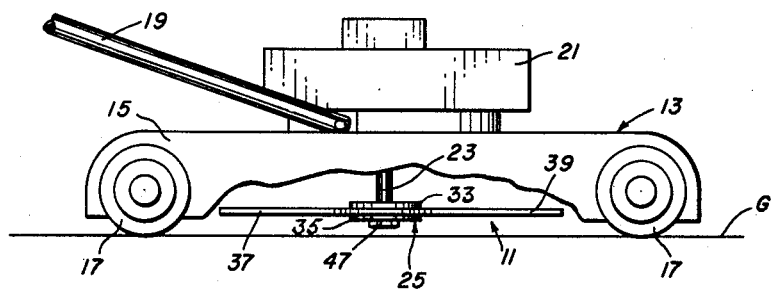
FIG. 2
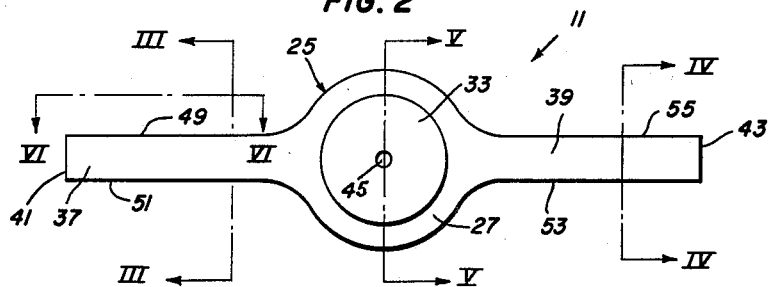
FIG. 3   FIG. 4   FIG. 5
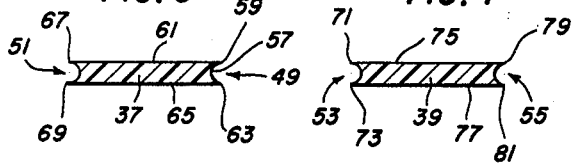   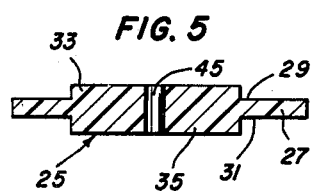
FIG. 7                     FIG. 6
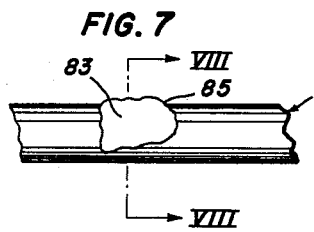   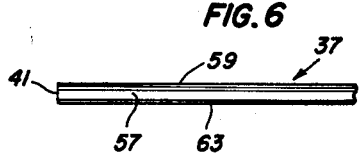
FIG. 8
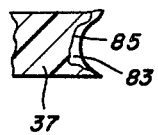
INVENTOR.
GUY E. JOYNER
BY John R. Walker, III
Attorney

United States Patent Office 3,156,082
Patented Nov. 10, 1964

3,156,082
MOWER BLADE CONSTRUCTION
Guy E. Joyner, 216 Alexander, Memphis, Tenn.
Filed July 26, 1962, Ser. No. 212,615
2 Claims. (Cl. 56—295)

This invention relates to a blade construction adapted to be used with a rotary type of mower for mowing lawns and the like.

In lawnmowers of the above mentioned type there are two principal problems. First, there is the problem or danger inherent in this type of mower caused by the rapidly rotating blade hitting rocks and the like and propelling them. As is known, many people have been injured from this cause. Secondly, there is the problem of keeping the blade of the lawnmower sharpened.

The normal or obvious approach to the problem first mentioned above has been to provide various guards or the like on the mower to block the path of the propelled rocks and the like to prevent them from injuring persons. However, such devices have not been completely successful for one reason or another. The normal or obvious approach to the second problem mentioned above was through metallurgy in attempting to give a metal blade that is resistive to dulling. Regardless of previous attempts to solve this problem, it still is necessary to periodically sharpen the lawnmower blades.

I have made an entirely different and unique approach to the two above mentioned problems, and have solved them by this simple but unobvious means, and that is by the use of polyethylene. To my knowledge, no one has solved these problems by this means. In fact, normally, a person would not think of the use of polyethylene for a lawnmower blade, and it would be a completely unobvious way to solve the problem. However, I have discovered that a polyethylene blade, when it hits something, will leave sharpened edges as opposed to metal which will leave a dull edge. In addition, I have discovered that such a blade will not throw rocks and the like.

Thus, one of the objects of the present invention is to provide a unique lawnmower blade formed of polyethylene or other plastic having similar characteristics that is completely safe and does not require sharpening.

A further object is to provide such a lawnmower blade that is economical and easy to manufacture.

A further object is to provide a light-weight lawnmower blade which won't rust or warp and which can be shipped for less cost.

A further object is to provide such a lawnmower blade which is easily adaptable to various types of lawnmowers.

A further object is to provide means in such a blade that renders it reversible.

A further object is generally to improve the design and construction of mower blades.

The means by which the foregoing and other objects of the present invention are accomplished and the manner of their accomplishment will be readily understood from the following specification upon reference to the accompanying drawings, in which:

FIG. 1 is a fragmentary side elevation view of a lawnmower using the blade construction of the present invention, with portions of the lawnmower being broken away for purposes of illustration.

FIG. 2 is an enlarged plan view of the blade per se.

FIG. 3 is a further enlarged sectional view taken as on the line III—III of FIG. 2, and turned 90 degrees relative to FIG. 2.

FIG. 4 is a sectional view on the scale of FIG. 3 taken as on the line IV—IV of FIG. 2, and turned 90 degrees relative to FIG. 2.

FIG. 5 is a sectional view on the scale of FIG. 3 taken as on the line V—V of FIG. 2, and turned 90 degrees relative to FIG. 2.

FIG. 6 is a fragmentary edge view on the scale of FIG. 3 of one of the blade arms taken as on the line VI—VI of FIG. 2.

FIG. 7 is a greatly enlarged fragmentary view of the edge of one of the blade arms showing a place where the blade has hit a rock or the like.

FIG. 8 is a fragmentary sectional view taken as on the line VIII—VIII of FIG. 7.

Referring now to the drawings in which the various parts are indicated by numerals, the blade 11 of the present invention is adapted to be used with the usual and well-known rotary type of lawnmower, as for example, like that shown in FIG. 1, wherein it will be seen the rotary lawnmower 13 comprises the usual frame 15 movably supported by wheels 17 for movement over the ground, indicated as at G. In addition, lawnmower 13 includes the usual handle 19 for pushing the lawnmower. Also, there is provided the usual motor, which its shown in the drawings as a gasoline motor 21, although it may be otherwise driven, as by electricity, without departing from the spirit and scope of the present invention. Lawnmower 13 is provided with the usual depending power shaft 23 which is driven by motor 21.

Referring now specifically to the blade 11 of the present invention, the blade is preferably entirely formed of a slightly resilient plastic, as polyethylene or the like. Blade 11 comprises a hub 25 including a substantially circular and flat mid-portion 27 having upper and lower surfaces 29, 31. In addition, hub 25 includes upper and lower disc-like portions 33, 35 preferably respectively integrally attached to mid-portion 27 adjacent the upper and lower surfaces 29, 31 thereof. Disc portions 33, 35 are concentric with one another and with mid-portion 27 and respectively extend in opposite directions, upwardly and downwardly, away from the mid-portion, as best seen in FIGS. 1 and 5. Stated another way, hub 25 can be thought of as being thicker adjacent the central portion thereof (that is, the combined thicknesses of disc-like portions 33, 35 and mid-portion 27) than the remaining portion thereof (the annular part of the mid-portion 27 outwardly of the disc-like portions 33, 35).

Blade 11 additionally includes a pair of horizontally extending blade arms 37, 39 which are integrally attached to mid-portion 27 at the inner ends of the arms and are on opposite sides of the mid-portion. The arms 37, 39 are preferably in the same plane with mid-portion 27 and extend outwardly in opposite directions from the mid-portion and terminate in distal ends 41, 43.

A bore 45 is provided centrally of hub 25 and therethrough, as best seen in FIGS. 2 and 5. To attach blade 11 to lawnmower 13, it is only necessary to place the blade on shaft 23 with the shaft extending through bore 45, and then a retaining nut 47 is threadedly engaged on the threaded lower end of shaft 23 below the hub. It will be understood that with the blade 11 mounted as above described, the blade will extend horizontally for rotation about a vertical axis extending through the central portion of hub 25. For purposes of clarity and not limitation, it is assumed that blade 11 rotates clockwise, as viewed in FIG. 2. Thus, blade arm 37 has a leading edge 49 and a trailing edge 51. Likewise, blade arm 39 has a leading edge 53 and a trailing edge 55.

On the leading edge 49 of blade arm 37, the blade arm is provided with a groove 57 which extends along the length of the arm. Groove 57 is preferably substantially semi-circular in cross section, as best seen in FIG. 3, so that it establishes an upper sharpened edge 59 at the juncture of the groove and the upper surface 61 of blade arm 37 and establishes a similar lower sharpened edge 63 at the juncture of the groove and the lower surface 65 of blade arm 37. In a like manner, similar grooves are preferably provided in trailing edge 51, leading edge 53, and trailing edge 55 so that upper and lower sharpened edges 67, 69 are respectively provided adjacent upper and lower surfaces 61, 65 on the trailing edge 51; upper and lower sharpened edges 71, 73 are respectively provided adjacent the upper and lower surfaces 75, 77 of blade arm 39 on leading edge 53; and upper and lower sharpened edges 79, 81 are respectively provided adjacent upper and lower surfaces 75, 77 on trailing edge 55. From the foregoing, it will be understood that there are two cutting edges respectively on the leading and trailing edges of each arm. In addition, it will be understood that only the pair of cutting edges on the leading edges of the arms can be effective at one time, but it will be understood that the blade may be reversed or turned upside down so that the edges which were previously the trailing edges now become the leading edges.

Referring now to FIGS. 7 and 8, which illustrate an example of what happens when the blade strikes an object, in these figures it will be seen that an indentation 83 has been made by the object and the outline or edge 85 of the indentation has provided a jagged or sharp edge 85, which naturally occurs at the borderline of the indentation and the remaining or undented portion of the blade. This condition is opposed to that condition that exists when a metal blade hits a sharpened edge, in which case the metal will simply be mashed or pushed in to leave a dull edge.

From the foregoing it will be apparent that the polyethylene blade 11 of the present invention provides many advantages over previous types of metal blades, which were not heretofore possible. Thus, a very inexpensive and highly effective blade is provided in the present invention which is more effective and much safer than metal blades and which is long lasting.

Although the invention has been described and illustrated with respect to a preferred embodiment thereof, it is to be understood that it is not to be so limited since changes and modifications may be made therein which are within the full intended scope of this invention as hereinafter claimed.

I claim:
1. In a rotary mower of the type having a depending vertically rotating power shaft, a blade comprising a hub including a substantially circular horizontally extending mid-portion and upper and lower disc-like portions respectively integrally attached to said mid-portion adjacent the upper and lower surfaces thereof, said disc-like portions being smaller in diameter than said mid-portion and being concentric with one another and with said mid-portion, a pair of horizontally extending blade arms integrally attached to said mid-portion on opposite sides thereof and extending outwardly in opposite directions from said mid-portion and terminating in distal ends, said hub being provided with a central bore extending therethrough, said blade being mounted directly on said power shaft with said power shaft extending through said bore and below said hub, means mounted on said shaft below said hub for securing said blade on said shaft for rotation therewith, each of said arms having leading and trailing edges and having upper and lower surfaces, each of said arms having a pair of longitudinally disposed grooves substantially semi-circular in cross-section and respectively in the leading and trailing edges thereof to provide upper and lower sharpened edges on said leading edge and said trailing edge respectively adjacent said upper and lower surfaces, said upper and lower sharpened edges being unobstructed whereby said upper and lower sharpened edges are effective as cutting edges, said blade being composed entirely of polyethylene and maintaining substantially the same shape when in operation as when standing still.

2. In a rotary mower of the type having a depending vertically rotating power shaft, a blade comprising a hub including a mid-portion, a pair of horizontally extending blade arms integrally attached to said mid-portion on opposite sides thereof and extending outwardly in opposite directions from said mid-portion and terminating in distal ends, said hub being provided with a central bore extending therethrough, said blade being mounted directly on said power shaft with said power shaft extending through said bore and below said hub, means mounted on said shaft below said hub for securing said blade on said shaft for rotation therewith, each of said arms having leading and trailing edges and having upper and lower surfaces, each of said arms having a pair of longitudinally disposed grooves respectively in the leading and trailing edges thereof to provide upper and lower sharpened edges on said leading edge and said trailing edge respectively adjacent said upper and lower surfaces, said upper and lower sharpened edges being unobstructed whereby said upper and lower sharpened edges are effective as cutting edges, said blade being composed entirely of polyethylene and maintaining substantially the same shape when in operation as when standing still.

References Cited by the Examiner

UNITED STATES PATENTS

| | | | |
|---|---|---|---|
| 1,842,312 | 1/32 | Cereda | 30—354 |
| 2,869,311 | 1/59 | Beeston | 56—295 |
| 2,963,844 | 12/60 | Engler | 56—295 |
| 3,087,298 | 4/63 | Phillips | 56—295 |
| 3,104,510 | 9/63 | Voight | 56—295 |

T. GRAHAM CRAVER, *Primary Examiner.*

RUSSELL R. KINSEY, *Examiner.*